Dec. 31, 1963 C. H. STEVENS, JR Re. 25,506

CABLE CONNECTOR ASSEMBLY

Original Filed Nov. 7, 1955

INVENTOR.
Charles H. Stevens, Jr.
BY Shoemaker & Mattare
ATTYS.

United States Patent Office

Re. 25,506
Reissued Dec. 31, 1963

25,506

CABLE CONNECTOR ASSEMBLY

Charles H. Stevens, Jr., Canaan, Conn., assignor to Empire Products, Incorporated, Cincinnati, Ohio, a corporation of Ohio Original No. 2,907,973, dated Oct. 6, 1959, Ser. No. 545,268, Nov. 7, 1955. Application for reissue July 28, 1961, Ser. No. 129,200

3 Claims. (Cl. 339—59)

Matter enclosed in heavy brackets [ ] appears in the original patent but forms no part of this reissue specification; matter printed in italics indicates the additions made by reissue.

This invention relates to improvements in cable connecting mechanisms and is more particularly directed to an improvement in connectors such as the type shown in my co-pending application Serial No. 461,505, filed October 11, 1954, now abandoned and this application is a continuation-in-part thereof.

One object of this invention is to provide an improved form of cable connector wherein the metallic coupling elements are each provided with readily deformable means thereon, with such means being adapted to receive the naked or bared end of the cable and deformed into engagement therewith to form a sole means for connecting the cable to the metallic elements.

Another object of the invention is to provide an improved cable connector of the character described wherein the metallic coupling elements utilize a cam locking interconnection embodying in one of the metallic portions a split or divided end portion, which split end portion is provided with a deformation which limits the amount by which the divided portions may be brought together and which materially lengthens the useful life of the connector or coupling elements.

Another object of this invention is to provide an improved cable connector assembly which includes male and female sections, each section including an inner metallic coupling element and an outer insulating sleeve disposed therearound, with there being means on the coupling element engaged with means within the outer sleeve so as to prevent relative rotation between the two elements when they are properly interengaged.

Another important object of this invention resides in the use of a pair of complemental insulating sleeve elements which are formed so as to constitute at their juncture male and female portions to form when interengaged a water tight seal and which elements are hollow to receive therein connected cable portions and wherein means is provided at the opposite free ends of the sleeve elements to sealingly engage with the cable insulation and form a water tight protective insulation around the region in which the cables are joined.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

Figure 1:
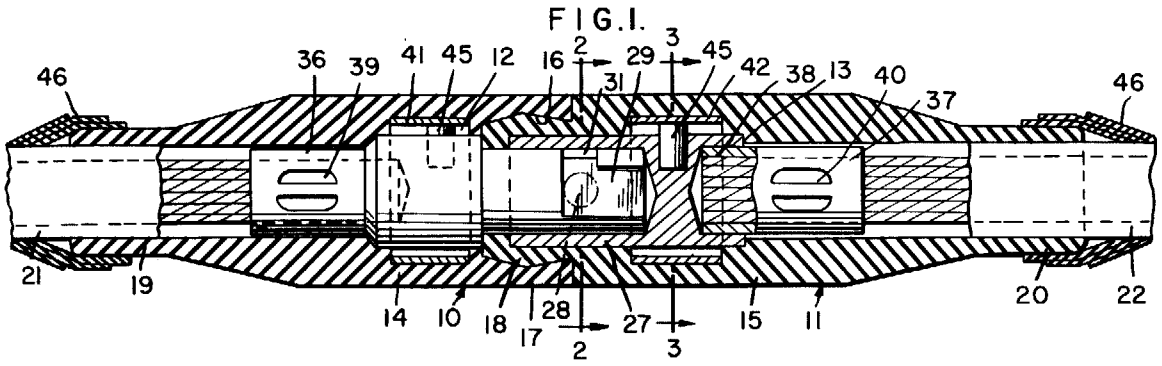
FIG. 1 is a longitudinal section taken through a connector assembly constructed in accordance with this invention.

Referring at this time more particularly to FIG. 1, the connector assembly therein shown will be seen to consist generally of two sections 10 and 11, which will hereinafter be designated, respectively, as the female and male sections. Each section includes an inner metallic coupling element 12 and 13, respectively, and an outer insulating sleeve 14 and 15, respectively. The insulating sleeves 14 and 15 are so formed as to constitute female and male portions, it being noted that the female sleeve 14 is provided with a double beveled recess 16 in its socket portion 17 whereas the male sleeve 15 is provided witha double beveled tip or projection 18 which when the parts are interengaged form a fluid tight seal therebetween and prevent the entrance of fluid, foreign material or the like.

Each sleeve has a cylindrical end portion 19 and 20 and as will be seen, the cable sections or lengths 21, 22 are projected through these ends of the sleeves for ultimate connection. It will be noted that the inner diameters of the cylindrical end portions 19 and 20 conform substantially to the outer diameter of the insulation of the cables 21 and 22 and, as set forth in my co-pending application Serial No. 461,505, it is contemplated to wrap rubber tape or the like about the end portions 19 and 20 and about adjacent portions of the cable insulation whereafter such tape or the like is vulcanized both to the end portions 19 and 20 and the cable insulation.

For this purpose and for the purpose of obtaining a good electrical insulation, the sleeves 14 and 15 are preferably constructed of rubber or other suitable material.

Figure 4:
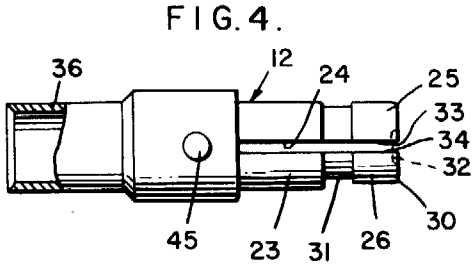
FIG. 4 is an elevational view, partly broken away, showing one of the metallic coupling elements.

The metallic coupling elements 12 and 13 are generally of conventional construction in that they utilize a male, female interconnection having a cam lock therebetween. As will be seen most clearly in FIGS. 1, 2, 4 and 5, the coupling element 12 has a reduced end portion 23 which is divided or split longitudinally as indicated by the reference character 24 to separate the same into the two portions 25 and 26 which normally assume the position shown in FIG. 4 but which can be squeezed together when inserted within the thimble portion 27 of the female coupling element 13. The female coupling element 13 is provided with an inwardly projecting pin 28 in its thimble portion 27 and the internal diameter of the thimble is slightly less than the outside diameter of the portion 23 of the male coupling element 12. The male coupling element is provided with a longitudinally extending flat 29 which permits the same to be inserted into the thimble 27, it being noted that the outer extremity of the reduced portion 23 is beveled as at 30 to aid the initial insertion. Communicating with this flat 29 is a circumferentially extending cam surface 31, see particularly FIG. 2, and as will be appreciated, the parts are so constructed that when they are fully inserted, the pin 28 on the thimble will be in position such that upon relative rotation between the two elements the pin 28 will move over the cam surface 31 and due to the eccentricities of the latter, will effect a very tight electrical connection between the two coupling elements.

As previously pointed out, the normal outside diameter of the portion 23 of the male coupling element is greater than the inside diameter of the thimble 27 and consequently when the two coupling elements are interengaged, the portions 25 and 26 will be squeezed together. Normally, with previous constructions repeated connection and disconnection of the coupling elements caused the portions 25 and 26 to take a permanent set and ultimately resulted in a loose or sloppy connection between the coupling elements. In accordance with this invention, however, it will be noted that the extremity of the portion 23 of the male coupling element is deformed or provided with an indentation 32 so as to result in detent or bulged-out portions 33 and 34 which are spaced apart as indicated by the reference character 35 a distance substantially less than the width of the slot 24 which separates the two portions 25 and 26. This is extremely important from a practical standpoint inasmuch as the slot 24 must of necessity be of a width corresponding to the tool for cutting the same and since, of course, this tool must have sufficient strength to perform its job, the resultant slot 24 is of greater width than is actually necessary to permit proper operation of the device. By upsetting or deforming the end to provide the bulges 33 and 34, the portions 25 and 26 can be squeezed together to as great an extent as would be occasioned by the provision of the slot 24 alone, and consequently in actual use the portions 25 and 26 cannot receive as great a permanent set as could previous constructions. This results in a much longer effective life for the coupling elements.

It will be noted that each of the coupling elements has disposed on its end opposite from the coupling portion a cylindrical sleeve, these sleeves being indicated by the reference characters 36 and 37. The main body portion of each coupling element is formed of brass to afford good electrical connection and one which is non-corrosive and conducive to long life. The sleeves 36 and 37 are, on the other hand, constructed of copper tubing, annealed to proper softness, so as to be readily deformable for a purpose hereinafter to be described.

Figure 2:
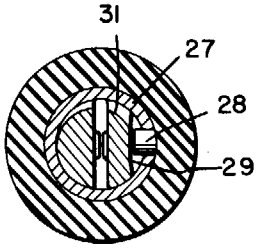
FIG. 2 is a transverse sectional view taken substantially along the planes of section line 2—2 of FIG. 1.
Figure 5:
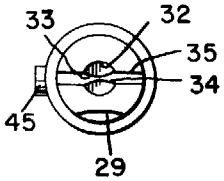
FIG. 5 is an end view of the element shown in FIG. 4.

Each coupling element has a recess, as for example, the recess 38 as shown in FIG. 1 in connection with element 13, into which one end of its corresponding sleeve 37 is projected and suitable means may be provided for effecting a good physical connection between the sleeve and the remainder of the coupling element. Such connection may be achieved, for example, by soldering or the like.

When the bared end of a cable is projected into one of the sleeves 36 and 37, a tool as set forth in my copending application S.N. 461,505 is utilized to crimp or deform the relatively soft and deformable sleeves 36 and 37 such that the sleeve tightly embraces or frictionally engages the bared end of the cable and thus provides a good physical and electrical connection therewith. Such deformation or crimping of the sleeves 36 and 37 is indicated by the reference characters 39 and 40, respectively, in FIG. 1.

Figure 3:
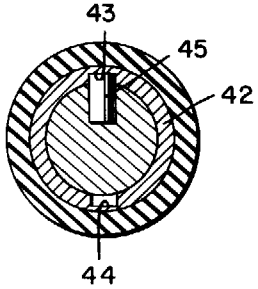
FIG. 3 is a transverse sectional view taken substantially along the plane of section line 3—3 of FIG. 1.

Embedded in each of the outer insulating sleeves 14 and 15 is a metallic ring, such rings being designated respectively by the reference characters 41 and 42. Each ring is provided with a pair of diametrically opposed, longitudinally extending splines or notches 43 and 44. The main body portion of each coupling element is provided with at least one radially projecting pin such as that illustrated in FIG. 3 and designated by the reference character 45, and when the coupling elements are initially engaged with their respective insulating sleeves, such pins 45 are so aligned as to be disposed within one or the other of the notches or slots 43 and 44. The rings 41 and 42 are embedded directly into the rubber material of the outer insulating sleeves and are bonded firmly thereto so that when the coupling elements are properly engaged therewith, no relative rotation can be had between the outer insulating sleeves and their associated coupling elments. The purpose of this construction is, of course, to permit an operator to twist in opposite directions on the two outer sleeves to effect connection and disconnection of the cam lock between the coupling elements.

This invention envisages the use of the outer insulating sleeves with the inner metallic elements removably inserted therewithin and also it is important to note that this invention may be either provided in a kit form in which the several elements thereof are not operatively engaged but are to be so engaged in the field, or to provide cable lengths, say of predetermined standard lengths such as 100 feet or the like, which have associated with the opposite ends thereof half sections of the connectors. In such latter case, the cable length would be provided at one end with a male coupling assembly and at its other end with a female coupling assembly so that several such lengths could be hooked up in series to provide an overall length as required.

It is believed that the broad provision of such above means constitutes a radical departure from similar devices now commonly in use and permits an entire installation or business to be converted to a standardized unit, that is, it will be appreciated that with cable lengths provided with the herein described connector assemblies, an entire shop can be fitted out so that all of the electrical components thereof may be interchangeably connected and hooked up with much diversification. This is particularly useful, for example, in ship yards where welding equipment is used to a large extent. In this case, it can be seen that with this invention any welder can be permitted to reach any part of a ship being built or any installation that requires welding by simply adding to his welding line such lengths of cable with the associated connectors therein which will enable him to reach out from the source of welding current to the point at which welding is to be done.

It is important to note that the pair of insulating sleeves when interengaged form a water tight seal at their juncture which will protect any exposed cable element therewithin. As seen most clearly in FIG. 1, the opposite free ends of the two sleeves are wrapped with insulating tape 46, which tape is also wrapped over a portion of the cable insulation projecting beyond the ends of the sleeves. Preferably, this tape is of rubber or rubber like substance and it is also preferred that the same be vulcanized so as to form a water tight seal with both the sleeves and the cable insulation immediately adjacent thereto. In this manner, it will be apparent that the two sleeves cooperate at their interengaged portion or juncture to provide a water tight seal whereas the opposite ends thereof are also sealed against the entrance of moisture such that the joined cable portions within the sleeves are at all times fully protected against the entrance of moisture, foreign material and the like. This is extremely important inasmuch as it enables splices to be made which, when covered over and protected by the above mentioned sleeves, will be entirely water tight and hence will provide a maximum of protection for workers and in all other respects will be extremely safe in operation. The seal formed by the sleeves when covered over a bared portion of the cable has been found in actual practice to provide a sufficiently tight seal and protective covering for the bared portion of the cable as to enable the use of the cable safely even in an atmosphere which is corrosive to the cable so in actuality the seal provided thereby is actually fluid tight rather than merely water tight.

The use of two sleeves to cover over two joined sections of cable, whether this joining be by connectors as is specifically disclosed herein or by other means, enables the final sealing operation to be made with extreme rapidity and with a minimum of effort. That is, the two sleeves can be very easily moved along the cable lengths if, for example, the two cable lengths have been joined by a conventional joint such as soldering and the sleeves are easily forced over the joint between the cable sections and enables the male and female portions thereof to be very easily interengaged to form a water tight seal. Thereafter, it only necessitates providing the opposite free ends of the sleeves with the insulating wrapping and subsequent vulcanization, if necessary, to complete the water tight and fluid tight protection for the joint.

I claim:

*1.* A cable connector assembly comprising a pair of preformed separate insulating elements adapted to be slipped over the ends of insulated cables and sealingly connected there, said insulating elements having complementary interengageable end portions which cooperate to form a water-tight joint in engagement with one another, each of said elements having a longitudinal bore formed therethrough, a ring member disposed within each of said longitudinal bores and being embedded within the associated insulating element and firmly bonded thereto, the inner surface of each of said ring members being exposed to and in communication with the bore through the associated insulating element, each of said rings having a longitudinally extending notch formed to said inner surface thereof, an electrically conductive coupling element for insertion within the bore of each of said insulating elements, said coupling elements having interengageable locking means operable to lock the coupling elements together upon relative rotation thereof, each of said coupling elements being provided with at least one radially projecting pin, each of said pins being for reception in a notch of an associated ring member, the interconnection between each pin and its associated ring member positively preventing relative rotation between the coupling element and the associated insulated element.

*2. A cable connector assembly comprising a pair of preformed separate and independent resilient insulating elements adapted to be slipped over the ends of insulated cables and sealingly disposed thereon, said insulating elements having complementary engageable end portions which cooperate to form a water-tight joint in engagement with one another, a separate and independent electrically conductive coupling element removably disposed within each of said insulating elements, a ring-like member fixedly disposed within each of said insulating elements and defining a longitudinally extending notch, each of said coupling elements including radially outwardly extending means received within the notch defined by the associated ring-like member for positively preventing relative rotation between each coupling element and the associated insulating element.*

*3. The cable connector assembly comprising a pair of preformed separate insulating elements having front end portions and rear end portions adapted to be slipped over the ends of insulated cables and sealingly connected therewith at the rear end portions, said insulating elements having complementary interengageable front end portions which cooperate to form a water tight joint when in engagement with one another, each of said elements having a longitudinal bore formed therein and extending from the rear end portions toward the front end portions and being of substantially the same internal diameter throughout*

*their extent each of the front end portions having a groove therein adjacent the forward end of the bore and forming a shoulder at the intersection of the groove and bore, a ring member disposed within each of the grooves and being embedded therein and firmly bonded thereto, the external diameter of each ring being larger than the internal diameter of the bore, each of said rings having an inner surface and having a longitudinally extending notch formed in said inner surface, an electrically conductive coupling element for insertion within the bore of said each insulating element, each coupling element and its associated sleeve including abutting shoulders for preventing relative longitudinal movement therebetween, said coupling elements having engageable locking means operable to lock the coupling elements together upon relative rotation thereof, each of said coupling elements having a radially projecting pin thereon, each of said pins engaging in the notch of each ring member, the interconnection between each pin and its associated notch positively preventing relative rotation between the coupling element and the associated insulated element and when the insulating elements are in engagement with each other the electrical coupling elements are positively sealed against the presence of moisture and the like.*

References Cited in the file of this patent or the original patent

UNITED STATES PATENTS

| | | |
|---|---|---|
| 2,030,080 | Waldron | Feb. 11, 1936 |
| 2,034,695 | Dougherty | Mar. 24, 1936 |
| 2,357,719 | Hoban | Sept. 5, 1944 |
| 2,370,725 | Gordon | Mar. 6, 1945 |
| 2,375,656 | Jackson | Mar. 8, 1945 |
| 2,501,674 | Graham | Mar. 28, 1950 |
| 2,509,929 | Kleinfelder | May 30, 1950 |
| 2,563,829 | Fitzgerald et al. | Aug. 14, 1951 |
| 2,638,367 | Bergan | May 12, 1953 |
| 2,677,115 | Stevens | Apr. 27, 1954 |
| 2,690,542 | Pearce | Sept. 28, 1954 |
| 2,724,098 | Bergan | Nov. 15, 1955 |
| 2,742,622 | Stevens | Apr. 17, 1956 |
| 2,758,291 | Richards | Aug. 7, 1956 |
| 2,760,579 | Kabakoff | Aug. 28, 1956 |
| 2,782,391 | Kirk | Feb. 19, 1957 |
| 2,851,670 | Senior | Sept. 9, 1958 |

FOREIGN PATENTS

| | | |
|---|---|---|
| 490,013 | England | Aug. 5, 1938 |